(12) United States Patent
Liu (10) Patent No.: US 11,811,958 B2
(45) Date of Patent: Nov. 7, 2023

(54) FOLDABLE TERMINAL

(71) Applicant: BEIJING XIAOMI MOBILE SOFTWARE CO., LTD., Beijing (CN)

(72) Inventor: Sai Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/708,990

(22) Filed: Mar. 30, 2022

(65) Prior Publication Data
US 2023/0085123 A1    Mar. 16, 2023

(30) Foreign Application Priority Data
Sep. 16, 2021    (CN) .......................... 202111086824.1

(51) Int. Cl.
*H04M 1/02*    (2006.01)
(52) U.S. Cl.
CPC ................................ *H04M 1/0216* (2013.01)
(58) Field of Classification Search
CPC ............. H04M 1/0216; H04M 1/0268; H04M 2250/16; G06F 1/1652; G06F 1/1616; G06F 1/1618; G06F 1/1626; G06F 1/1643; G06F 1/165; G06F 1/1681; F16M 11/38; F16M 13/00; F21V 15/04; F21V 21/30; H10K 59/121; H10K 59/40; H10K 59/50; H10K 77/111; Y02E 10/549

USPC ........................................................ 455/575.1
See application file for complete search history.

(56) References Cited

U.S. PATENT DOCUMENTS

| | | | |
|---|---|---|---|
| 10,082,839 B1 * | 9/2018 | Turchin .................. | G09F 9/301 |
| 10,838,458 B1 * | 11/2020 | Park ..................... | H04M 1/0268 |
| 2018/0095502 A1 | 4/2018 | Yamazaki et al. | |
| 2021/0044682 A1 * | 2/2021 | Liu ..................... | H04M 1/0268 |
| 2022/0263930 A1 * | 8/2022 | Koh ..................... | H04M 1/0216 |

FOREIGN PATENT DOCUMENTS

EP    3109847 A1    12/2016

OTHER PUBLICATIONS

European Patent Application No. 22165368.6, Search Report dated Oct. 10, 2022, 5 pages.
European Patent Application No. 22165368.6, Office Action dated Oct. 21, 2022, 7 pages.

* cited by examiner

*Primary Examiner* — Joel Ajayi
(74) *Attorney, Agent, or Firm* — COZEN O'CONNOR (57) ABSTRACT

A foldable terminal includes a body, a display screen and a flattening member. The display screen is located on a surface of the body and includes a bendable portion. The flattening member is located between the body and the bendable portion, and configured to apply a force to the bendable portion, so as to flatten the bendable portion when the foldable terminal is in a flattened state.

15 Claims, 7 Drawing Sheets

FOLDABLE TERMINAL

CROSS-REFERENCE TO RELATED APPLICATION

This application is based on and claims priority to the Chinese Patent Application No. 202111086824.1 filed on Sep. 16, 2021, the entire content of which is incorporated herein by reference.

BACKGROUND

With the development of terminal technology, terminals, such as mobile devices, are being used more and more widely, and have become one of the most important tools in people's daily work and life. Foldable terminals are often favored due to a small space size and shape that is lightweight and easy to carry. However, to increase screen size a foldable terminal will used a foldable display screen, that may tend to collapse in the area in which it bends. This area may be difficult to be flatten completely, resulting in a poor visual effect and a poor user experience of the foldable terminal.

SUMMARY

The present disclosure relates to a field of folding technologies, and more particularly, to a foldable terminal.

According to a first aspect, a foldable terminal is provided. The foldable terminal includes a body, a display screen and a flattening member. The display screen is located on a surface of the body and includes a bendable portion. The flattening member is located between the body and the bendable portion, and configured to apply a force to the bendable portion, such that the bendable portion is flat when the foldable terminal is in a flattened state.

In a second aspect, a foldable terminal includes a body and a display screen. The display screen is located on a surface of the body. The display screen includes a bendable portion, and when the foldable terminal is in a flattened state, the bendable portion and the body are in contact or in partially contact with a force generated between the bendable portion and the body when the foldable terminal is in a flattened state.

It should be understood that the foregoing general description and the following detailed description are merely exemplary and explanatory and cannot be construed to limit the present disclosure, as claimed.

BRIEF DESCRIPTION OF THE DRAWINGS

The accompanying drawings, which are incorporated into and constitute a part of the specification, illustrate embodiments consistent with the present disclosure, and together with the description, serve to explain the principles of the present disclosure. In the accompanying drawings.

The definite embodiments of the present disclosure have been shown by the above accompanying drawings, and will be described in more detail below. These accompanying drawings and textual descriptions are not construed to limit the scope of the concept of the present disclosure in any way, but are intended to explain the concept of the present disclosure to those skilled in the art by referring to the specific embodiments.

DETAILED DESCRIPTION

Exemplary embodiments will be described in detail herein, and examples of the embodiments will be illustrated in the accompanying drawings. When the following description relates to the accompanying drawings, the same numbers in different accompanying drawings represent the same or similar elements unless otherwise indicated. The implementations described in the following exemplary embodiments do not represent all implementations consistent with the present disclosure. Instead, they are only examples of devices and methods consistent with some aspects of the present disclosure as detailed in the appended claims.

Figure 1:
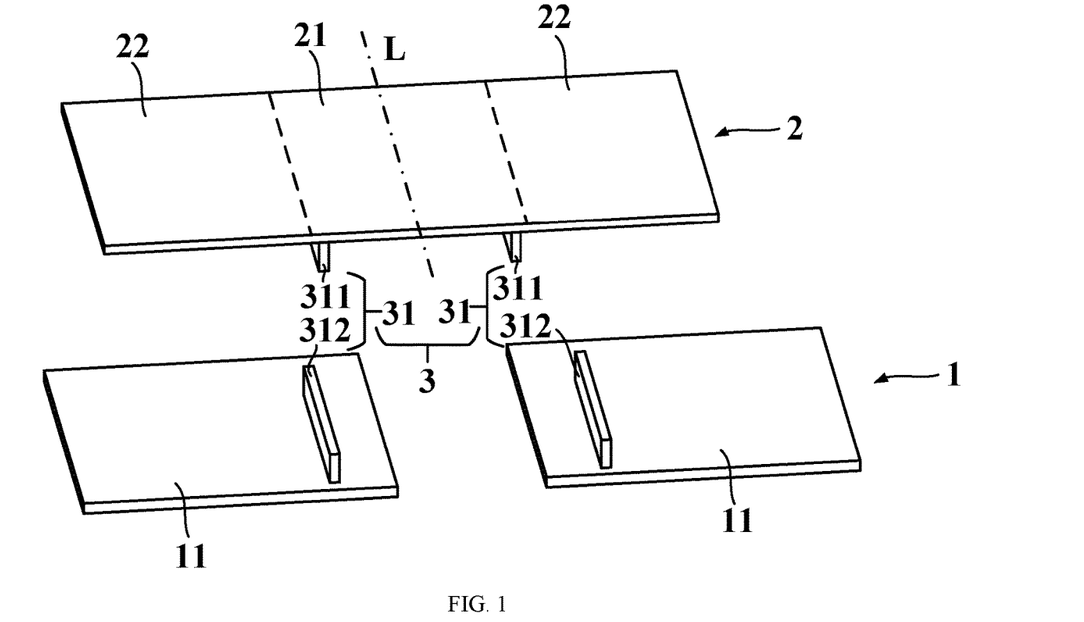
FIG. 1 is a exploded perspective view of a foldable terminal shown according to an embodiment.

Embodiments of the present disclosure provide a foldable terminal. FIG. 1 is an exploded view of a foldable terminal provided according to the embodiments of the present disclosure. Although FIG. 1 takes a mobile phone as an example for an illustrative purpose, it may be understood that the foldable terminal is not limited to the mobile phone, but also a tablet computer, a display, etc.

It should be noted that the foldable terminal is switched between a flattened state and a folded state under an action of a folding mechanism. Since an improvement of the present embodiment does not lie in the folding mechanism, the folding mechanism is not shown in accompanying drawings.

The present disclosure provides a foldable terminal, which may overcome the problems existing in a related art.

The foldable terminal may be a terminal capable of folding in a left-right direction, or the foldable terminal may also be a terminal capable of folding in an up-down direction, which is not limited in the present disclosure, and in the accompanying drawings, the folding in the left-right direction may be used as an example.

The foldable terminal may be folded inwardly or outwardly. The folded inwardly means after the foldable terminal is folded, a display screen 2 is located inside. The folded outwardly means after the foldable terminal is folded, the display screen 2 is located outside.

As shown in FIG. 1, the foldable terminal includes a body 1 and a display screen 2. The display screen 2 is laid on a surface of the body 1. The body 1 is a component configured to support and fix the display screen 2. Specifically, the body 1 may be a middle frame or a structure including the middle frame.

The display screen 2 is a flexible display screen. Since the display screen 2 is the flexible display screen, the stiffness is weak, a reinforcement piece is usually adopted for supporting. Thus, the display screen 2 may include a reinforcement piece and a screen, and the reinforcement piece is fitted to the screen to form the display screen 2. The reinforcement piece may be a stainless steel (SS). Thus, the display screen 2 described below may specifically refer to the reinforcement piece of the display screen 2, or the display screen 2 may also specifically refer to an assembly formed by the reinforcement piece and the screen fitted with each other.

Specific structures of the body 1 and the display screen 2 are not limited in the present embodiment. A fixing relationship among the body 1, the display screen 2 and a flattening member 3, as well as solutions to flatten the display screen 2 in a bending area are introduced below.

In an example, since the foldable terminal may be folded, the body 1 may include two or more body portions 11. Two adjacent body portions 11 of these body portions 11 are rotatably connected, and the two adjacent body portions 11 may be rotatably connected under an action of a foldable structure.

For example, the body 1 includes two body portions 11, and the foldable terminal may be folded into double screens. For another example, the body 1 includes three body portions 11, and the foldable terminal may be folded into triple screens. The body 1 may further include more body portions 11, and the foldable terminal may be folded into more screens.

The number of the body portions 11 included in the body 1 is not limited in the present embodiment, and the body portions 11 including two adjacent body portions 11 may be taken as an example.

In order to adapt to the folding of the foldable terminal, accordingly, the display screen 2 includes at least one bendable portion 21. A part of the display screen 2 other than the bendable portion 21 is configured to be fixed to the body 1, and may be referred to as a fixing portion 22. Therefore, the display screen 2 includes at least one bendable portion 21 and more than one fixing portions 22, and each bendable portion 21 is located between two adjacent fixing portions 22.

For example, in case that the foldable terminal may be folded into double screens, one bendable portion 21 and two fixing portions 22 are provided. For another example, in case that the foldable terminal may be folded into triple screens, two bendable portions 21 and three fixing portions 22 are provided. In case that the foldable terminal may be folded into more screens, more bendable portions 21 and more fixing portions 22 are also provided.

The number of the bendable portions 21 and the number of the fixing portions 22 included in the display screen 2 are not limited in the present embodiment, and the display screen including one bendable portion 21 and two fixing portions 22 adjacent to the bendable portion 21 may be taken as an example.

Figure 2:
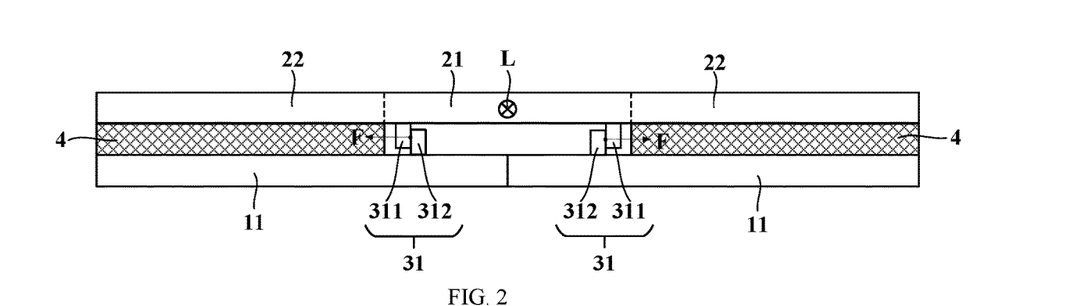
FIG. 2 is a side view of the foldable terminal of FIG. 1.

For example, as shown in FIG. 2, the display screen 2 is laid on the surface of the body 1, a position of the fixing portion 22 is opposite to a position of the body portion 11, and the fixing portion 22 is fixedly connected to the body portion 11. The bendable portion 21 of the display screen 2 is not fixed with the body portion 11 of the body 1, so as to stretch and retract during the folding.

A fixing manner between the body portion 11 of the body 1 and the fixing portion 22 of the display screen 2 may include an adhesive manner. For example, as shown in FIG. 2, an adhesive layer 4 is provided between the body portion 11 and the fixing portion 22.

During the repeated folding of the foldable terminal, the bendable portion 21 of the display screen 2 deforms at a folding position, causing the collapse of the foldable terminal in the flattened state. In order to avoid such a scenario, as shown in FIG. 1, the foldable terminal includes a flattening member 3 located between the body 1 and the bendable portion 21. For example, a part of the flattening member 3 is located between one of the body portions 11 and the bendable portion 21, and the other part of the flattening member 3 is located between the other the body portion 11 and the bendable portion 21. The flattening member 3 is configured to apply a force to the bendable portion 21 to flatten the bendable portion 21 when the foldable terminal is in the flattened state.

The flattened state of the foldable terminal may be a state in which the two body portions 11 of the foldable terminal are in a same plane, i.e., an included angle between the two body portions 11 is 180 degrees. The folded state of the foldable terminal may be a state in which the included angle between the two body portions 11 of the foldable terminal is greater than or equal to 0 degrees and less than 180 degrees. A state in which the included angle between the two body portions 11 is 0 degree may be referred to as a folded-in-half state of the foldable terminal, or it may also be referred to as a fully folded state.

In an example, when the display screen 2 is in the flattened state, the flattening member 3 may apply a tensile force, towards the fixing portion 22, to the bendable portion 21, so as to flatten the bendable portion 21. The flattening member 3 may also apply a force perpendicular to the fixing portion 22 and towards the display screen 2, to the bendable portion 21, so as to flatten the bendable portion 21.

In this way, the foldable terminal includes the flattening member 3, such that when the foldable terminal is in the flattened state, the flattening member 3 may apply the force, enabling to flatten the bendable portion 21, to the bendable portion 21 of the display screen 2. Further, after the foldable terminal is switched from the folded state to the flattened state, the display screen of the foldable terminal may be flattened in the bending area, so as to enhance visual effect of user, and improve the user experience.

As described above, the flattening member 3 may apply the tensile force to the bendable portion 21 of the display screen 2. Accordingly, a structure of the flattening member 3 is shown in FIG. 1, and the flattening member 3 may include two sets of limit protrusions 31, and each set of limit protrusions 31 includes a first protrusion 311 and a second protrusion 312.

As shown in FIG. 1, each of the first protrusions 311 and each of the second protrusions 312 have a long strip shape, and a direction of the strip is parallel to a center line L of the bendable portion 21. The center line L of the bendable portion 21 may be a crease line of the bendable portion 21.

As shown in FIG. 1, the first protrusions 311 of the two sets of limit protrusions 31 are respectively fixed on two sides of the center line L of the bendable portion 21, i.e., the first protrusion 311 of one set of limit protrusions 31 is located on a side of the center line L of the bendable portion 21, and the first protrusion 311 of the other set of limit protrusions 31 is located on the other opposite side of the center line L of the bendable portion 21.

As shown in FIG. 1, the second protrusions 312 of the two sets of limit protrusions 31 are both fixed on the body 1, for example, on the two body portions 11 respectively. That is, the second protrusion 312 of the one set of limit protrusions 31 is fixed on the one of the body portions 11, and the second protrusion 312 of the other set of limit protrusions 31 is fixed on the other body portion 11.

As shown in FIG. 2, the two second protrusions 312 are located between the two first protrusions 311, i.e., the first protrusion 311 in each set of limit protrusions 31 is away from the center line L of the bendable portion 21, and the second protrusions 312 are close to the center line L of the bendable portion 21. Continuing to refer to FIG. 2, when the foldable terminal is in the flattened state, the first protrusion 311 and the second protrusion 312 of each set of limit protrusions 31 are in contact or in partially contact with a force generated between the first protrusion and the second protrusion.

The first protrusion 311 and the second protrusion 312 are in contact or in partially contact with a force generated between the first protrusion and the second protrusion, i.e., the first protrusion 311 and the second protrusion 312 are in contact with each other and a force is generated between the first protrusion 311 and the second protrusion 312. The first protrusion 311 and the second protrusion 312 are in an interference fit.

In this way, when the foldable terminal is switched from the folded state to the flattened state, referring to FIG. 2, in case that the bendable portion 21 of the display screen 2 tends to collapse or bulge, the second protrusion 312 may apply a pushing force to the first protrusion 311 due to the interference fit between the first protrusion 311 and the second protrusion 312 of the same set. For example, the second protrusion 312 on a left side of the center line L may apply a pushing force to the left to the first protrusion 311, while the second protrusion 312 on a right side of the center line L may apply a pushing force to the right to the first protrusion 311, such that the bendable portion 21 is stretched and flattened.

In an example, a height of the first protrusion 311 and a height of the second protrusion 312 in each set of limit protrusions 31 may be related to a spacing between the display screen 2 and the body 1. For example, the height of the first protrusion 311 and the height of the second protrusion 312 may be slightly less than the spacing between the display screen 2 and the body 1, such that a contact area of the first protrusion 311 and the second protrusion 312 is relatively large, and the second protrusion 312 is not easily staggered with the first protrusion 311 when pushing the first protrusion 311.

The height of the first protrusion 311 and the height of the second protrusion 312 are not limited in the present embodiment, the height of the first protrusion 311 and the height of the second protrusion 312 are designed such that when the foldable terminal is in the flattened state, the second protrusion 312 of the same set as the first protrusion 311 may push the first protrusion 311 to flatten the bendable portion 21.

In an example, due to a small distance between the body 1 and the display screen 2, the height of the first protrusion 311 and the height of the second protrusion 312 are also small. In case that the height of the first protrusion 311 and the height of the second protrusion 312 are too small, the second protrusion 312 and the first protrusion 311 may be staggered with each other when the second protrusion 312 pushes the first protrusion 311. For example, the second protrusion 312 on the left side of the center line L may be staggered with the first protrusion 311 and move to a left side of the first protrusion 311, and the second protrusion 312 on the right side of the center line L may be staggered with the first protrusion 311 and move to a right side of the first protrusion 311.

Figure 3:
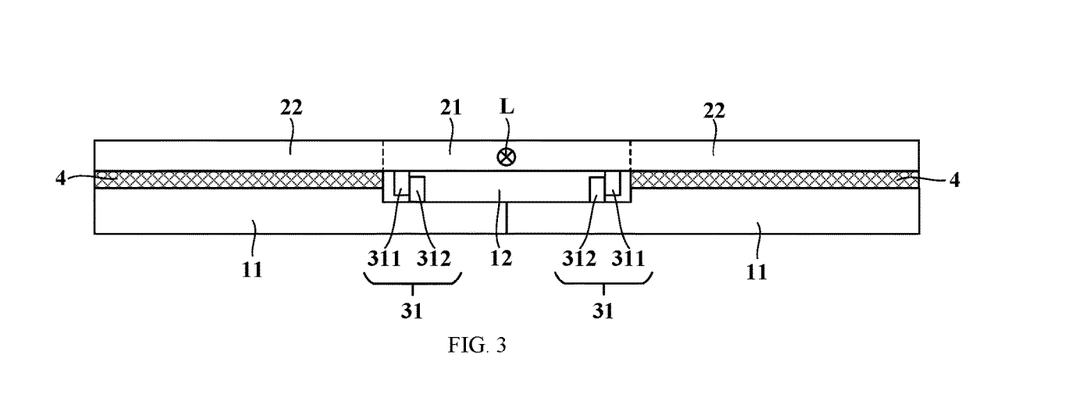
FIG. 3 is a side view of the foldable terminal of FIG. 1.

In order to avoid that the second protrusion 312 and the first protrusion 311 are staggered with each other due to small heights of the first protrusion 311 and the second protrusion 312 when the second protrusion 312 pushes the first protrusion 311, accordingly, as shown in FIG. 3, the body 1 is defined with a groove 12 at a position corresponding to the bendable portion 21. In this way, due to the existence of the groove 12, the spacing between the bendable portion 21 and the body 1 also increases, and the second protrusion 312 of each set of limit protrusions 31 is located in the groove 12, such that the height of the first protrusion 311 and the height of the second protrusion 312 may also increases. Once the height of the first protrusion 311 and the height of the second protrusion 312 are relatively large, a situation that the second protrusion 312 and the first protrusion 311 are staggered with each other when the second protrusion 312 pushes the first protrusion 311 may be avoided.

Whether the body 1 is defined with the groove 12 at the position corresponding to the bendable portion 21 is not limited in the present embodiment, and may be flexibly designed according to the actual situation.

As for shapes of the first protrusion 311 and the second protrusion 312 in each set of limit protrusions 31, as shown in FIG. 1 and referring to FIG. 2, cross-sectional shapes of the first protrusion 311 and the second protrusion 312 may be rectangular.

Figure 4:
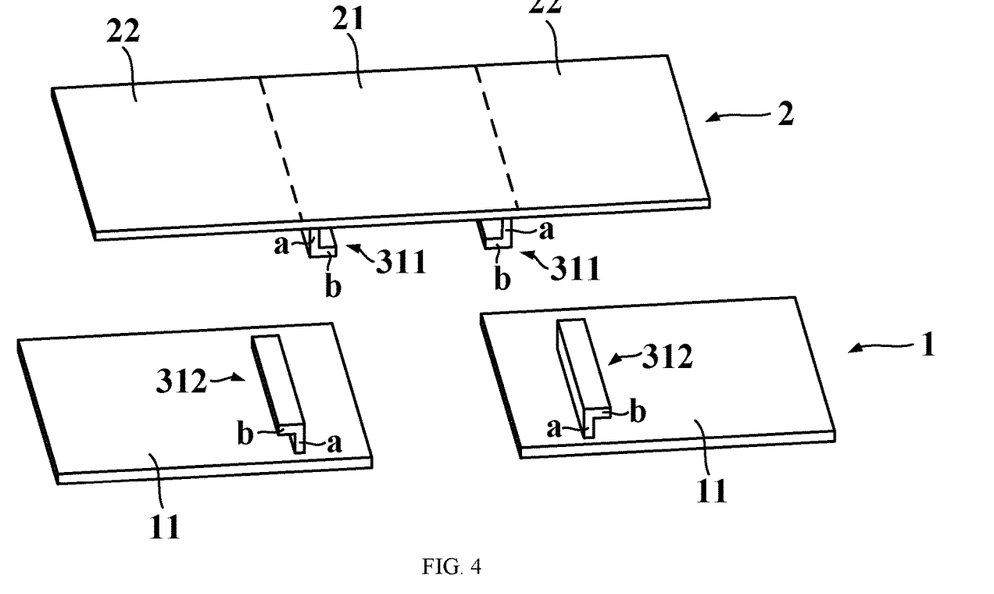
FIG. 4 is a exploded perspective view of a foldable terminal shown according to an embodiment.
Figure 5:
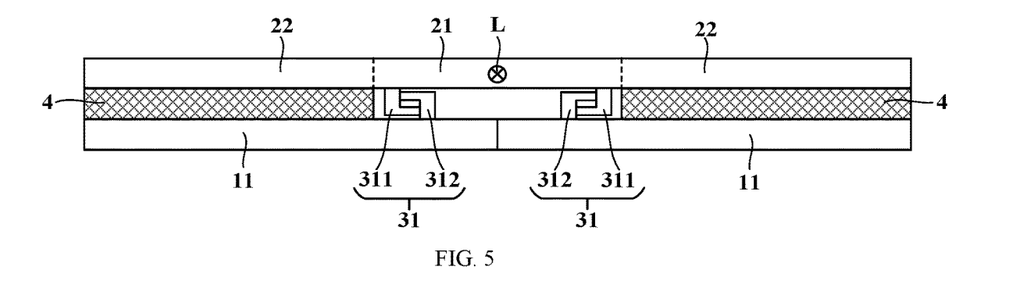
FIG. 5 is a side view of the foldable terminal of FIG. 4.

For another example, as shown in FIG. 4 and referring to FIG. 5, the cross-sectional shapes of the first protrusion 311 and the second protrusion 312 may be L-shaped, and the protrusion of these shapes may be referred to as an L-shaped protrusion structure.

Then, as shown in FIG. 4, the first protrusion 311 includes a vertical part a and a transverse part b, and the second protrusion 312 also includes a vertical part a and a transverse part b.

As shown in FIG. 4, the vertical parts a of the two first protrusions 311 are both fixed with the bendable portion 21, and the transverse parts b of the two first protrusions 311 extend towards the center line L of the bendable portion 21. The vertical parts a of the two second protrusions 312 are both fixed with the body 1, and the transverse parts b of the two second protrusions 312 extend away from the center line L of the bendable portion 21.

As shown in FIG. 5, when the foldable terminal is in the flattened state, the transverse part b of each first protrusion 311 and the vertical part a of the second protrusion 312 of the same set are in contact or in partially contact with a force generated between the transverse part b of each first protrusion 311 and the vertical part a of the second protrusion 312 of the same set, and the vertical part a of each first protrusion 311 and the transverse part b of the second protrusion 312 of the same set are in contact or in partially contact with a force generated between the vertical part a of each first protrusion and the transverse part b of the second protrusion of the same set.

An included angle between the vertical part a and the transverse part b of the first protrusion 311 and the second protrusion 312 may be a rounded right angle.

The specific shapes of the first protrusion 311 and the second protrusion 312 of each set of limit protrusions 31 are not limited in the present embodiment, as long as the force applied to the bendable portion 21 enables to stretch and flatten the bendable portion 21.

Figure 6:
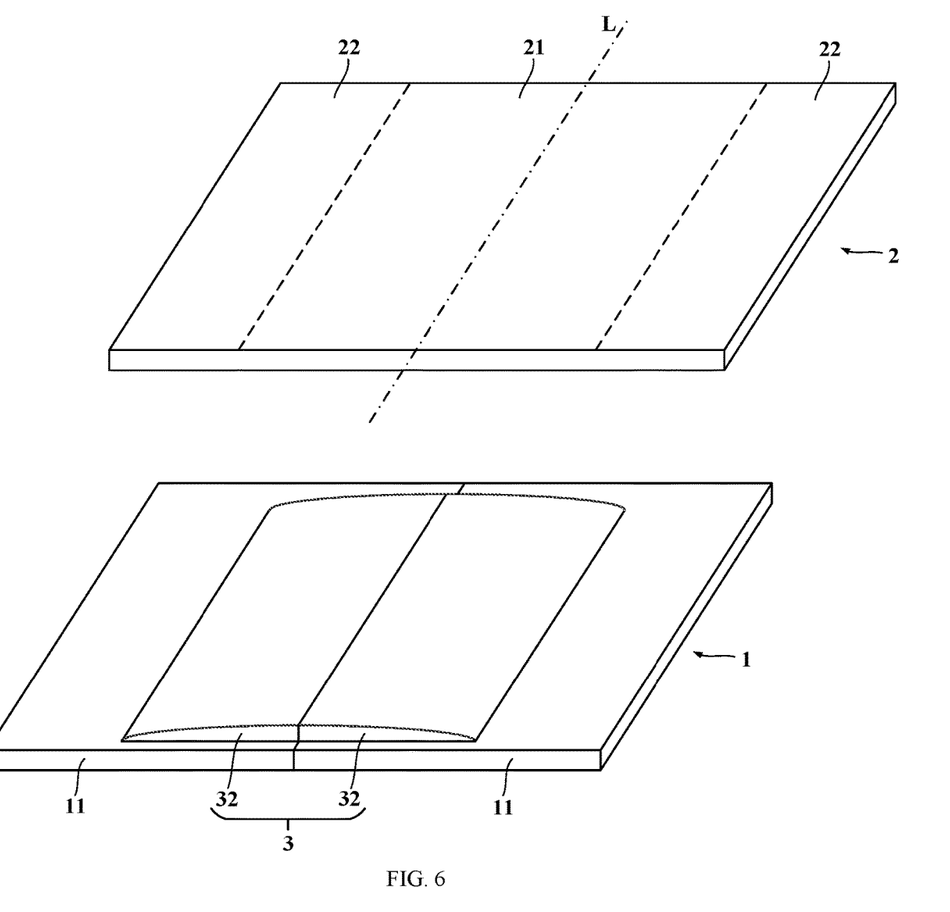
FIG. 6 is a exploded perspective view of a foldable terminal shown according to an embodiment.
Figure 7:
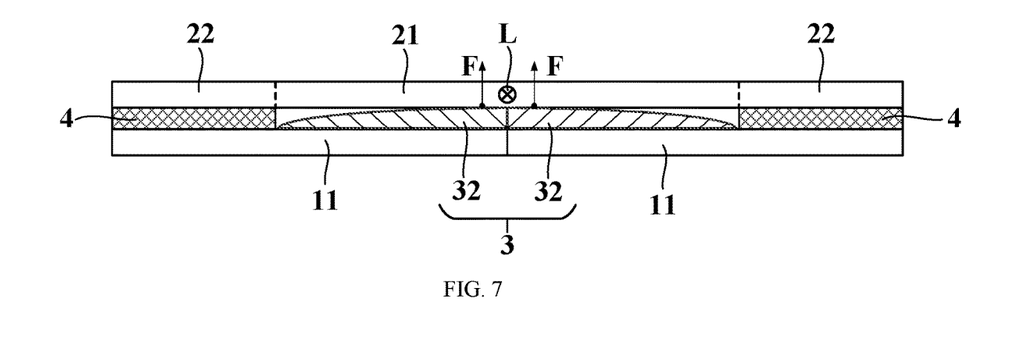
FIG. 7 is a side view of the foldable terminal of FIG. 6.
Figure 8:
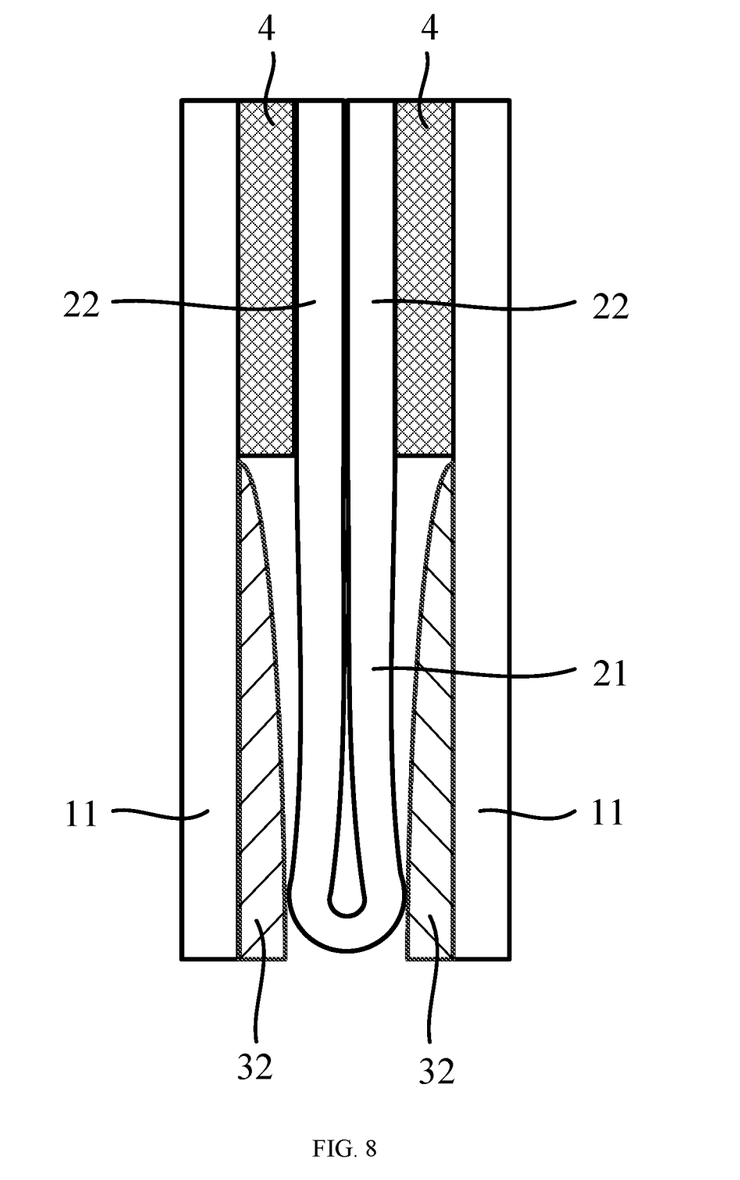
FIG. 8 is a side view of the foldable terminal of FIG. 6 when folded.

As described above, when the foldable terminal is in the flattened state, the flattening member 3 may also flatten the bendable portion 21 by applying a force perpendicular to the bendable portion 21 and pointing to a direction facing away from the body 1 to the bendable portion 21. Accordingly, as shown in FIG. 6, the flattening member 3 may include two elastic members 32 located on two sides of the center line L of the bendable portion 21. As shown in FIG. 7, when the foldable terminal is in the flattened state, the two elastic members 32 are in contact with each other and the two elastic members 32 and the bendable portion 21 are in contact or in partially contact with a force generated between the two elastic members 32 and the bendable portion 21. When the foldable terminal is in the folded state, the two elastic members 32 are away from each other, as shown in FIG. 8, FIG. 8 is a schematic view of the foldable terminal in a folded-in-half state.

The elastic member 32 may be elastic in a thickness direction and may be compressed in the thickness direction. When the display screen 2 is in the flattened state, the elastic member 32 is compressed between the bendable portion 21 and the body 1 to achieve that the two elastic members 32 and the bendable portion 21 are in contact or in partially contact with the force generated between the two elastic members 32 and the bendable portion 21.

In an example, material of the elastic member 32 may be a silicone pad or a copper foil or foam. The silicone pad or the copper foil has a certain thickness, and may be compressed in the thickness direction, and may rebound after the removal of an external force that causes the compression.

In an example, since the bendable portion 21 is mainly prone to collapse or bulge at a crease, for example, the bendable portion 21 is prone to collapse or bulge at the center line L, the thickness of the elastic member 32 may gradually reduce from a first end to a second end of the elastic member 32. A position of the first end and a position of the second end of the elastic member 32 are opposite to each other, and the first end is an end located at the center line L of the bendable portion 21, as shown in FIG. 6 and FIG. 7.

In an example, a shape of a surface of the elastic member 32 may be an arc shape, so as to realize that the thickness of the elastic member 32 may reduce gradually from the first end to the second end. For example, as shown in FIG. 6, the shape of the surface of the elastic member 32 close to the bendable portion 21 is an arc shape. Alternatively, the surface of the elastic member 32 facing away from the bendable portion 21 may be an arc shape.

In some embodiments, the thickness of the elastic member 32 at each position may also be equal, i.e., the thickness of the elastic member 32 at each position from its first end to its second end is equal.

A thickness distribution of the elastic member 32 is not limited in the present embodiment, as long as the elastic member 32 is compressed at a position close to the center line L when the foldable terminal is flattened, such that the elastic member 32 applies a vertical upward force to the bendable portion 21 to flatten the bendable portion 21.

As described above, two elastic members 32 are located between the body 1 and the bendable portion 21. Regarding a fixing relationship of the elastic member 32, one case may be that the elastic member 32 may be fixed on the body portion 11 of the body 1. For example, as shown in FIG. 6, the elastic member 32 and the body portion 11 on the same side of the center line L of the bendable portion 21 are fixed with each other. The first end of the elastic member 32 close to the center line L and a first end of the body portion 11 close to the center line 1 may be flush with each other, such that when the foldable terminal is in the flattened state, the two elastic members 32 may contact each other, such that the bendable portion 21 is pushed up and to be flattened.

Figure 9:
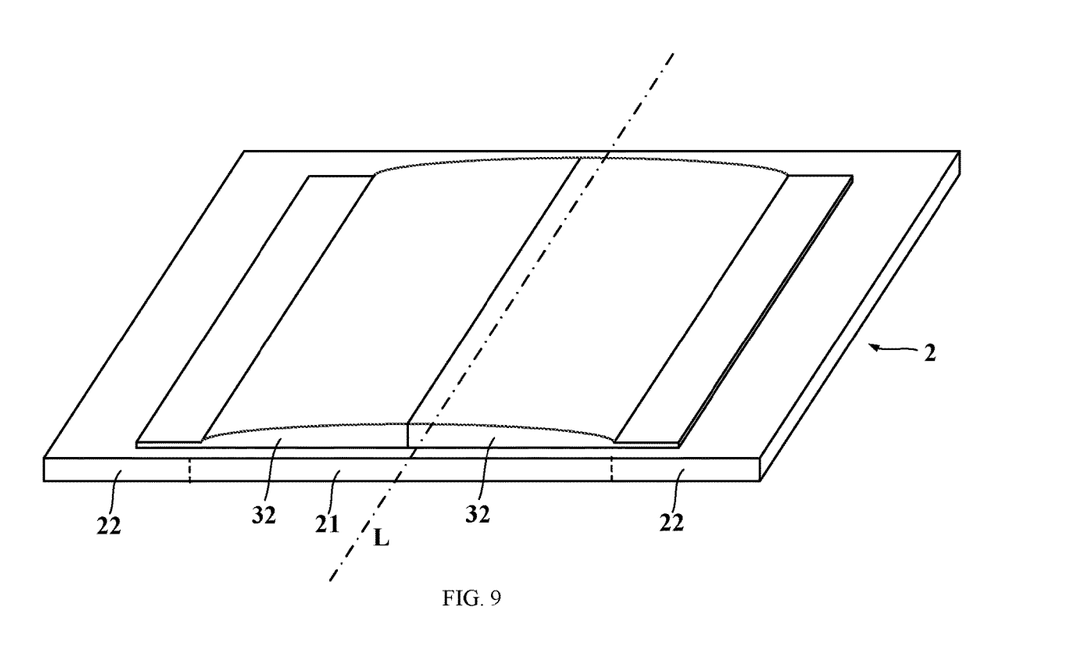
FIG. 9 is a perspective view of an elastic member fixed on a display screen shown according to an embodiment.

In an example, the elastic member 32 may also be fixedly connected to the display screen 2. As shown in FIG. 9, the elastic member 32 and the display screen 2 on the same side of the center line L of the bendable portion 21 is fixedly connected to each other, and the elastic member 32 and the bendable portion 21 are not fixed with each other, such that the elastic member 32 can not affect the bending and folding of the bendable portion 21.

For example, as shown in FIG. 9, a part of the elastic member 32 close to its second end is fixedly connected to the fixing portion 22, while a part of the elastic member 32 close to its first end is not fixed with the bendable portion 21. The first end of the elastic member 32 is an end close to the center line L of the bendable portion 21, the second end of the elastic member 32 is an end away from the center line L of the bendable portion 21, and the position of the first end and the position of the second end are opposite to each other.

Whether the elastic member 32 is fixedly connected to the body portion 11 of the body 1 or the fixing portion 22 of the display screen 2 is not limited in the present embodiment, and may be flexibly selected according to the actual situation.

The above elastic member 32 flattens the bendable portion 21 through a telescopic elasticity in the thickness direction. Another elastic member 32 is introduced below, which may also flatten the bendable portion 21.

Figure 10:
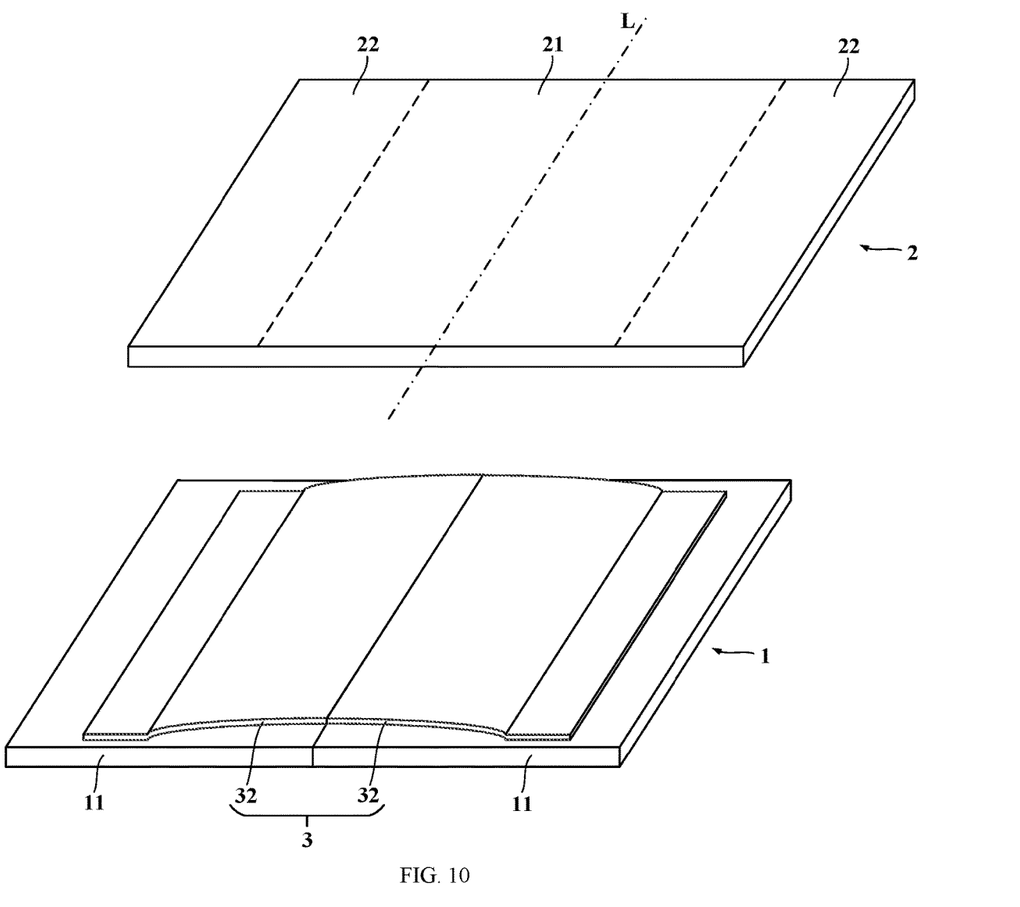
FIG. 10 is a exploded perspective view of a foldable terminal shown according to an embodiment.
Figure 11:
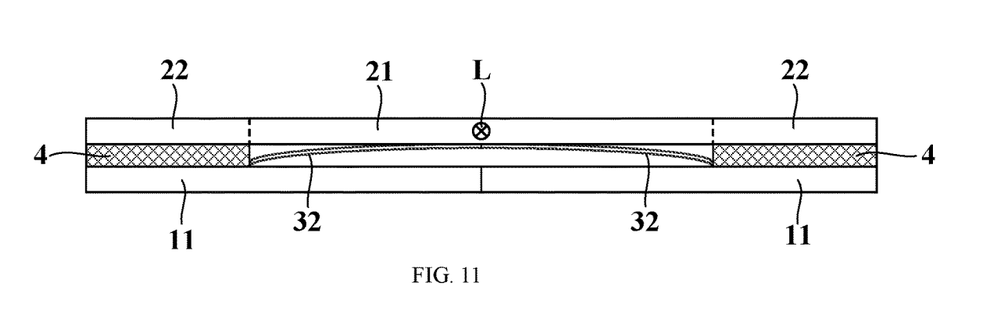
FIG. 11 is a side view of the foldable terminal of FIG. 10.

As shown in FIG. 10, the elastic member 32 is a metal resilient tab with a relatively thin thickness. A first end of the metal resilient tab is fixed with the body portion 11 of the body 1, and a second end of the metal resilient tab is upward relative to the body portion 11 of the body 1 and opposite to a position of the center line L, as shown in FIG. 11. The metal resilient tab is compressed between the bendable portion 21 and the body 1.

As shown in FIG. 10, each elastic member 32 includes two parts, namely a fixing part and an upward part, respectively. The fixing part is configured to be fix to the body portion 11, the upward part is upward relative to the body portion 11, and the upward part may rotate around a junction relative to the fixing part, such that the elastic member 32 has elasticity.

An end of the upward part away from the fixing part is opposite to the position of the center line L of the bendable portion 21, for example, both are in a same vertical plane.

In this way, when the foldable terminal is switched from the folded state to the flattened state, as shown in FIG. 11, the upward part of the elastic member 32 and the bendable portion 21 are in contact or in partially contact, and a force perpendicular to the bendable portion 21 and pointing to the bendable portion 21 is applied to the bendable portion 21, so as to flatten the bendable portion 21.

Specific structures of the elastic member 32 are not limited in the present embodiment, as long as the elastic member 32 and the bendable portion 21 are is in contact or in partially contact with the force generated between the elastic member 32 and the bendable portion 21 when foldable terminal is in the flattened state, such that the bendable portion 21 is pushed up and to be flattened.

Based on the above description, when the foldable terminal is in the flattened state, the flattening member 3 that may apply an action to the bendable portion 21 to flatten the bendable portion 21 may include the following solutions.

Solution 1, the flattening member 3 includes the above-mentioned two sets of limit protrusions 31. Each set of limit protrusions 31 includes a first protrusion 311 and a second protrusion 312. When the foldable terminal is in the flattened state, the second protrusion 312 generates a pushing force on the first protrusion 311 of the same set, such that the bendable portion 21 fixedly connected to the first protrusion 311 is stretched and flattened.

Solution 2, the flattening member 3 may include the above-mentioned two elastic members 32. The elastic members 32 may have elasticity in compression along the thickness direction or may be a metal resilient tab. When the foldable terminal is in the flattened state, a force perpendicular to the bendable portion 21 and pointing to the bendable portion 21 is applied to the bendable portion 21 through the elastic member 32, such that the bendable portion 21 is compressed and flattened.

Solution 3, the flattening member 3 may include both the above-mentioned two sets of limit protrusions 31 and the above-mentioned two elastic members 32. Through a cooperative action of the limit protrusions 31 and the elastic members 32, the bendable portion 21 is flattened when the foldable terminal is in the flattened state.

In the solutions shown in the present disclosure, since the foldable terminal includes the flattening member, when the foldable terminal is in the flattened state, the flattening member may apply a force that may flatten the bendable portion to the bendable portion of the display screen. Further, after the foldable terminal is switched from the folded state to the flattened state, the display screen of the foldable terminal may be flattened in the bending area, so as to enhance the visual effect of the user, and improve the user experience.

The embodiments of the present disclosure further provide a foldable terminal. The foldable terminal may be a mobile phone, a tablet computer, a display, etc.

The foldable terminal is switched between a flattened state and a folded state under an action of a folding mechanism. Since an improvement of the present embodiment does not lie in the folding mechanism, the folding mechanism is not shown in accompanying drawings.

The foldable terminal may be a terminal capable of folding in a left-right direction, or the foldable terminal may also be a terminal capable of folding in an up-down direction, which is not limited in the present disclosure, and in the accompanying drawings, the folding in the left-right direction may be used as an example.

The foldable terminal may be folded inwardly or outwardly. The folded inwardly means after the foldable terminal is folded, a display screen is located inside. The folded outwardly means after the foldable terminal is folded, the display screen is located outside.

Figure 12:
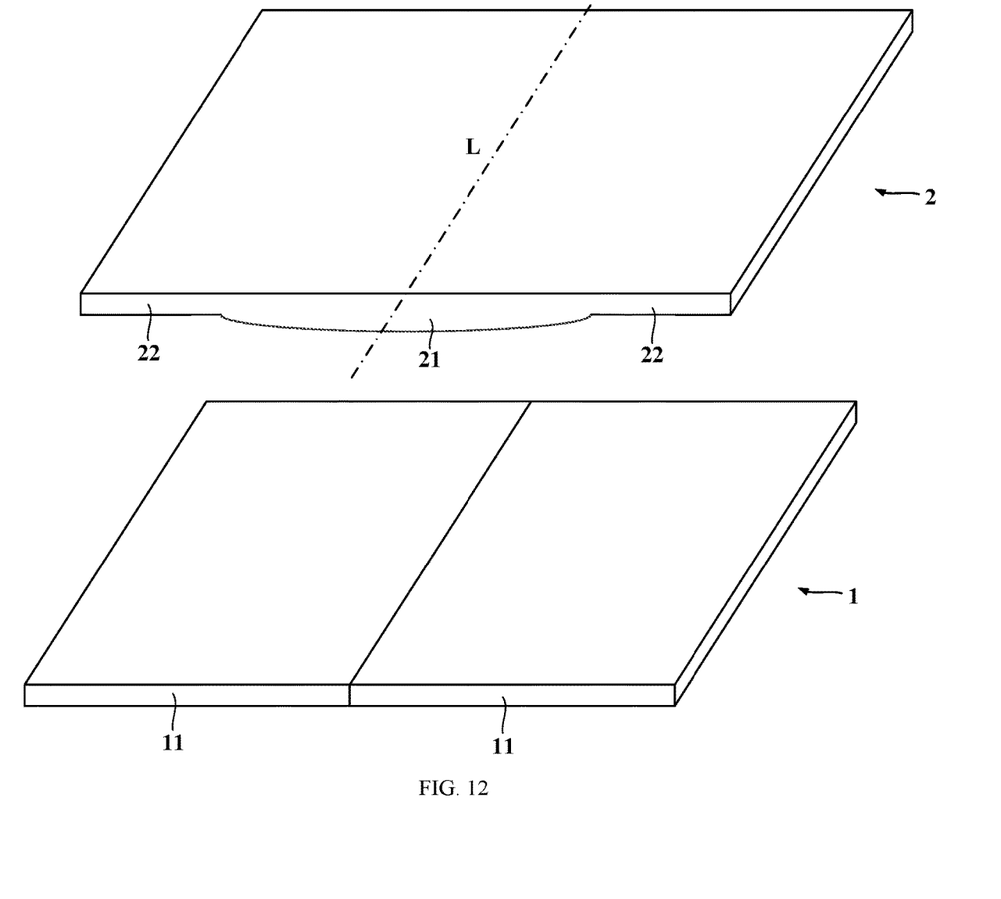
FIG. 12 is a exploded perspective view of a foldable terminal shown according to an embodiment.

As shown in FIG. 12, the foldable terminal includes a body 1 and a display screen 2. The display screen 2 is laid on a surface of the body 1. The body 1 is a component configured to support and fix the display screen 2. Specifically, the body 1 may be a middle frame or a structure including the middle frame.

The display screen 2 is a flexible display screen. Since the display screen 2 is the flexible display screen, the stiffness is weak, a reinforcement piece is usually adopted for supporting. Thus, the display screen 2 may include a reinforcement piece and a screen, and the reinforcement piece is fitted to the screen to form the display screen 2. The reinforcement piece may be a steel use stainless (SUS). Thus, the display screen 2 described below may specifically refer to the reinforcement piece of the display screen 2, or the display screen 2 may also specifically refer to an assembly formed by the reinforcement piece and the screen fitted with each other.

Specific structures of the body 1 and the display screen 2 are not limited in the present embodiment. Solutions to flatten the display screen 2 in a bending area are introduced below.

In an example, since the foldable terminal may be folded, the body 1 may include more than one body portions 11. Two adjacent body portions 11 of the body portions 11 are rotatably connected, and the two adjacent body portions 11 may be rotatably connected under an action of a foldable structure.

For example, the body 1 includes two body portions 11, and the foldable terminal may be folded into double screens. For another example, the body 1 includes three body portions 11, and the foldable terminal may be folded into triple screens. The number of the body portions 11 included in the body 1 is not limited in the present embodiment, and the body portions 11 including two adjacent body portions 11 may be taken as an example.

In order to adapt to the folding of the foldable terminal, the display screen 2 includes at least one bendable portion 21. A part of the display screen 2 other than the bendable portion 21 is configured to be fixed to the body 1, and may be referred to as a fixing portion 22. Therefore, the display screen 2 includes at least one bendable portion 21 and more than one fixing portions 22, and each bendable portion 21 is located between two adjacent fixing portions 22.

For example, in case that the foldable terminal may be folded into double screens, one bendable portion 21 and two fixing portions 22 are provided. For another example, in case that the foldable terminal may be folded into triple screens, two bendable portions 21 and three fixing portions 22 are provided. The number of the body portions 11 included in the body 1 is not limited in the present embodiment, and the body portions 11 including two adjacent body portions 11 may be taken as an example.

Figure 13:
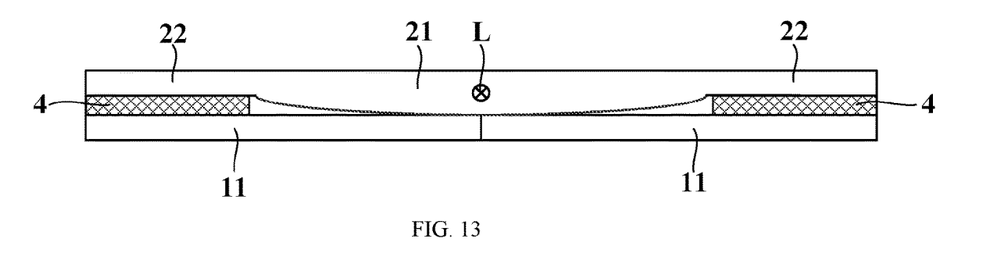
FIG. 13 is a side view of the foldable terminal of FIG. 12.

As shown in FIG. 13, when the display screen 2 is in the flattened state, the bendable portion 21 and the body 1 are in contact or in partially contact with a force generated between the bendable portion 21 and the body 1. The bendable portion 21 are the body 1 are in contact or in partially contact with a force generated between the bendable portion 21 and the body 1, and that is, the bendable portion 21 and the body 1 are in contact or in partially contact with each other and generate a mutual squeezing force. As shown in FIG. 13, the bendable portion 21 and the body 1 are in contact or in partially contact with a force generated between the bendable portion 21 and the body 1, that is, a part of the bendable portion 21 and one of the body portions 11 of the body 1 are in contact or in partially contact with a force generated between the part of the bendable portion 21 and the one of the body portions 11, and the other part of the bendable portion 21 and the other body portion 11 of the body 1 are in contact or in partially contact with a force generated between the other part of the bendable portion 21 and the other body portion 11 of the body 1.

In this way, when the foldable terminal is in the flattened state, the bendable portion 21 and the body 1 are in contact or in partially contact with the force generated between the bendable portion 21 and the body 1, such that, in case that the bendable portion 21 collapses, the body 1 applies the squeezing force to the bendable portion 21, so as to flatten the bendable portion 21.

In an example, since the bendable portion 21 is mainly prone to collapse or bulge at a crease, for example, the bendable portion 21 is prone to collapse or bulge at the center line L, the thickness of the bendable portion 21 may gradually reduce from the center line L of the bendable portion 21 to two sides of the center line L, as shown in FIG. 12 and referring to FIG. 13.

In some embodiments, the thickness of the bendable portion 21 at each position may also be equal, i.e., the thickness of the bendable portion 21 at each position from its center line L to two sides of its center line L is equal.

In an example, the foldable terminal may further include the above-mentioned flattening member 3. The flattening member 3 may include the above-mentioned limit protrusion 31, may further include the above-mentioned elastic member 32, and may further include the limit protrusion 31 and the elastic member 32.

In the solutions shown in the present disclosure, when the foldable terminal is in the flattened state, the bendable portion and the body are in contact or in partially contact with a force generated between the bendable portion and the body, such that, in case that the bendable portion collapses, the body applies a squeezing force to the bendable portion, so as to flatten the bendable portion. Thus, the display screen of the foldable terminal may be flattened in the bending area, so as to enhance the visual effect of the user and improve the user experience.

It should be understood that the present disclosure is not limited to the precise structures described above and shown in the accompanying drawings, and various modifications and changes may be made without departing from its scope. The scope of the present disclosure is limited only by the appended claims.

What is claimed is:

1. A foldable mobile terminal, comprising a body, a display screen and a flattening member;
   the display screen being located on a surface of the body, and the display screen comprising a bendable portion;
   the flattening member being located between the body and the bendable portion, and the flattening member being configured to apply a force to the bendable portion, such that the bendable portion is flattened when the foldable mobile terminal is in a flattened state,
   wherein the flattening member comprises two sets of limit protrusions, and each set of limit protrusions comprises a first protrusion and a second protrusion;
   the first protrusions of the two sets of limit protrusions are respectively fixed on two sides of a center line of the bendable portion, the second protrusions of the two sets of limit protrusions are respectively fixed on the body, and the two second protrusions are located between the two first protrusions;
   when the foldable mobile terminal is in the flattened state, the first protrusion and the second protrusion of each set of limit protrusions are in contact or partially in contact with each other with a force generated between the first protrusion and the second protrusion,
   wherein the first protrusion and the second protrusion of each set of limit protrusions are an L-shaped protrusion structure;
   a vertical part of each first protrusion is fixed with the bendable portion, and transverse parts of the two first protrusions extend towards the center line of the bendable portion;
   the vertical part of each second protrusion is fixed with the body portion, and transverse parts of the two second protrusions extend away from the center line of the bendable portion;
   when the foldable mobile terminal is in the flattened state, the transverse part of each first protrusion and the vertical part of the second protrusion of the same set are in contact or in partially contact with a force generated between the transverse part of each first protrusion and the vertical part of the second protrusion of the same set, and the vertical part of each first protrusion and the transverse part of the second protrusion of the same set are in contact or in partially contact with a force generated between the vertical part of each first protrusion and the transverse part of the second protrusion of the same set.

2. The foldable mobile terminal according to claim 1, wherein the flattening member comprises two elastic members located on two sides of the centerline of the bendable portion;
   when the foldable mobile terminal is in the flattened state, the two elastic members are in contact with each other and the two elastic members and the bendable portion are in contact or in partially contact with a force generated between the two elastic members and the bendable portion.

3. The foldable mobile terminal according to claim 2, wherein each elastic member has elasticity in a thickness direction, and each elastic member is compressed between the bendable portion and the body when the foldable mobile terminal is in the flattened state.

4. The foldable mobile terminal according to claim 3, wherein a thickness of each elastic member gradually reduces from a first end of each elastic member to a second end of each elastic member, a position of the first end and a position of the second end of each elastic member are opposite to each other, and the first end is an end located on the center line of the bendable portion.

5. The foldable mobile terminal according to claim 4, wherein each elastic member is fixed with the body.

6. The foldable mobile terminal according to claim 4, wherein a part of each elastic member close to the second end is fixed with the display screen.

7. The foldable mobile terminal according to claim 3, wherein material of each elastic member is any one of a silicone pad, a copper foil and foam.

8. The foldable mobile terminal according to claim 2, wherein each elastic member comprises a metal resilient tab;
   a first end of the metal resilient tab is fixed with the body, a second end of the metal resilient tab is upward relative to the body and opposite to a position of the center line, and the metal resilient tab is compressed between the bendable portion and the body.

9. The foldable mobile terminal according to claim 1, wherein the first protrusion and the second protrusion have a strip shape, and a length direction of the first protrusion and a length direction of the second protrusion are parallel to a center line of the bendable portion.

10. The foldable mobile terminal according to claim 9, wherein a height of the first protrusion and a height of the second protrusion are less than a spacing between the display screen and the body.

11. The foldable mobile terminal according to claim 9, wherein the body is defined with a groove at a position corresponding to the bendable portion.

12. The foldable mobile terminal according to claim 1, wherein a cross-sectional shape of the first protrusion and a cross-sectional shape of the second protrusion are rectangular.

13. The foldable mobile terminal according to claim 3, wherein a thickness of each elastic member at each position from a first end of each elastic member to a second end of each elastic member is equal.

14. The foldable mobile terminal according to claim 1, wherein the body is a middle frame or a structure comprising the middle frame.

15. The foldable mobile terminal according to claim 1, wherein the body comprises more than one body portions, two adjacent body portions are rotatably connected.

* * * * *